Patented June 12, 1928.

1,673,197

UNITED STATES PATENT OFFICE.

HERMANN KOLLMANN, OF ERLANGEN, GERMANY.

SPRING MOTOR.

Application filed June 18, 1927, Serial No. 199,789, and in Germany July 22, 1925.

This invention relates to an improved arrangement of series-connected wire springs in spring motors, in which the provision of spring drums is omitted. The improved arrangement has the advantage that, besides complicated constructional parts such as drums being not employed, a very large number of springs of small breadth are connected in series on a bounded and narrow space, by choosing for the wire springs the cross-sections most favourable for resisting and bending moments. The improved arrangement contains further a connection of the individual springs in such a way that each spring can be easily mounted and dismounted without requiring a complete dismounting of all parts of the series of springs. Repairs can thus be executed in a simple and cheap way. A spring motor comprising the improved arrangement is, once wound-up, rather long-acting.

Figure 1:
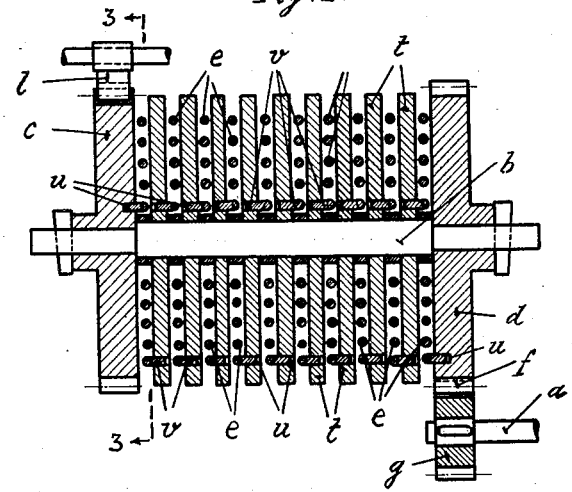
Figure 2:
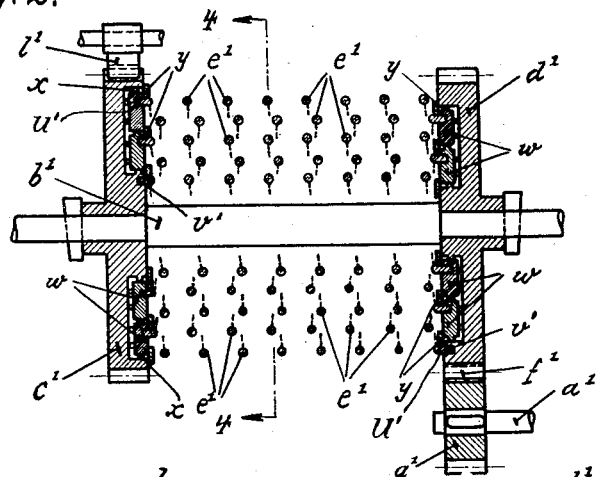
Figure 3:
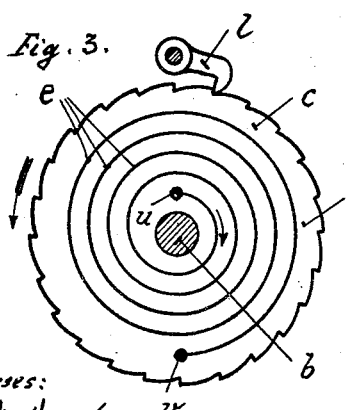
Figure 4:
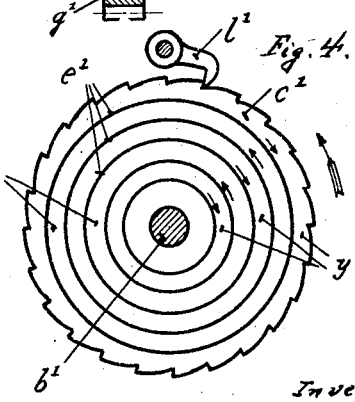

The accompanying drawing illustrates the improved arrangement: Figs. 1 and 2 are longitudinal sections of two preferred constructional forms thereof, while Figs. 3 and 4 are cross-sections, respectively on the lines 3—3 of Fig. 1 and 4—4 of Fig. 2.

Hereinafter, the opposite ends of a spring are briefly called: poles, the outer or inner ends of flat or helical spirals being thus similar poles, as are also the right-hand or left-hand ends of elongated or coil spirals.

Any device may be driven from the shaft $a$. On a shaft $b$ two wheels $c$ and $d$ are rotatably mounted, which are connected by a plurality of laterally cohering springs $e$. The driving wheel $d$ meshes by a toothing $f$ with the toothed wheel $g$ coupled with the shaft $a$. The tensioning wheel $c$ is a ratchet wheel in which engages a pawl lever $l$ so as to prevent said wheel from returning when tensioning the springs $e$. Said springs $e$ are series-connected in such a way that with the employment of springs of similar winding direction the opposite poles and with the employment of springs of alternately different winding direction the similar poles are connected with each other. In order to permit an easy lateral connection of the springs and a separation of the same for preventing any friction and contact between their edge parts, discs $t$ are revolubly mounted on the shaft $b$ and provided with square or round borings $u$ in which the pinlike lateral extensions $v$ on the ends of the individual springs are inserted, which arrangement at the same time neutralizes any transverse strains and allows an easy mounting and dismounting of the springs simply by a displacemet of said extensions parallel to the spring axis.

Fig. 1 shows the example of helical spirals and the arrangement of springs of similar winding direction.

Fig. 2 shows a constructional form of the subject matter of the invention for elongated or coil spirals with a compact arrangement of springs of different winding direction. The reference letters $a'$, $b'$, $c'$, $d'$, $e'$, $f'$, $g'$, $l'$ designate corresponding parts to those in the former example. The inner plane faces of the wheels $c'$ and $d'$ have concentric rings $w$ inserted in corresponding recesses therein, with each of which the similar poles of two succeeding concentric elongated spirals $e'$ are connected. The beginning of the first spiral and the end of the last spiral are, as in the former example, connected with the wheels $c'$ and $d'$. On the wheels $c'$, $d'$ as well as on the rings $w$ semi-annular bulbs $x$ are provided for reducing friction between the sliding planes. Instead thereof, the rings may be mounted on ball-bearings as known in the art and therefore not illustrated. Further flat rings $y$, which after insertion of the rings $w$ in the recesses in the wheels $c'$, $d'$ are screwed to said wheels or to each of said rings, or attached by any other similar means, prevent the rings $w$ from getting displaced toward the springs $e'$. The ends $v'$ of the elongated spirals are rectangularly bent parallel to the spring axis and inserted in suitable square or round borings $u'$ of the wheels $c'$, $d'$ and of the rings $w$, which arrangement corresponds to that shown in Figs. 1 and 3 but which due to the movability of the spring ends in the guides $u'$ neutralizes the transverse strains else occurring with this modified arrangement and to which the parts $c'$, $d'$, $w$, $y$ would be detrimentally exposed. The spring ends may also be located in their guides $u'$ by roller or ball bearings in a way known in the art and therefore not illustrated.

In Figs. 3 and 4, the large arrows indicate the direction of movement or rotation of the tensioning wheel $c$, or $c'$, while the small arrows indicate the winding direction of the springs $e$, or $e'$, which in Fig. 2 is indicated by short dotted lines.

The operation of the improved arrangement is as follows:—

By arresting the driving wheel $d$, or $d'$ and turning the tensioning wheel $c$, or $c'$, said turning is transmitted to the first spring $e$, or $e'$, directly connected with the latter. As the attachment-point (opposite pole) of the first and of all succeeding springs is also movable, said turning and tensioning is transmitted to the whole series of springs, the spring action available at $g$ becoming the longer the more springs are series-connected in the system. The individual springs can be tensioned to normal intensity. After finished tensioning, the tensioning wheel $c$, or $c'$, is locked against turning backwards by the pawl lever $l$. When releasing the driving wheel $d$, the additive spring action of the springs $e$, or $e'$, is available at the consumption place $g$ for a rather long use without requiring a re-winding-up of the tensioning wheel.

To suit desires or requirements, the operation of the tensioning wheel $c$, or $c'$, can, of course, be effected with the aid of a suitable transmission gear known in the art and therefore not illustrated.

The improved arrangement can also be used as a driving motor for vehicles, ships, and airships, the operation of the tensioning wheel being then sometimes effected by water, wind, or any other power.

Particularly with the employment of flat spirals of round cross-section or such of rectangular cross-section placed on edge, spring series of very high intensity and long-lasting spring action, can be assembled in one compact arrangement.

When operating the tensioning wheel by means of periodically acting natural forces, such as for instance the waves of the tide, for which purpose said wheel need simply be connected with a propeller, an automatically tensioned stationary driving motor can be obtained.

What I claim is:—

The combination, in a drumless spring motor, a plurality of series-connected wire springs, connection members consisting of wheels and discs rotatable along the plane faces of the individual springs and having borings therein, and pinlike lateral extensions on the ends of said springs engaging in said borings and capable of being disengaged therefrom by their displacement parallel to the spring axis.

In testimony whereof I have hereunto set my hand.

HERMANN KOLLMANN.